Figure 1:
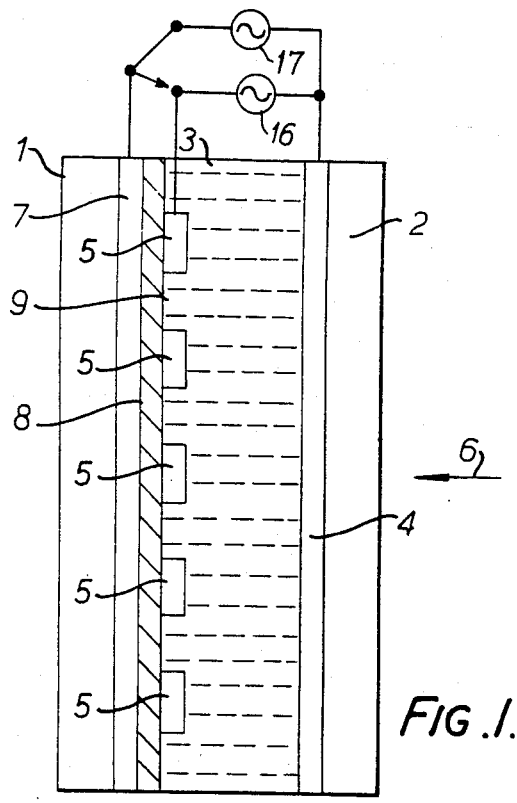

United States Patent
Byatt

[11] 3,914,019
[45] Oct. 21, 1975

[54] LIQUID CRYSTAL DISPLAY ARRANGEMENTS

[75] Inventor: Dennis William George Byatt, Chelmsford, England

[73] Assignee: The Marconi Company Limited, Chelmsford, England

[22] Filed: Feb. 19, 1974

[21] Appl. No.: 443,757

[30] Foreign Application Priority Data
Mar. 8, 1973  United Kingdom............... 11364/73

[52] U.S. Cl. .......................................... 350/160 LC
[51] Int. Cl.² ............................................ G02F 1/13
[58] Field of Search............................... 350/160 LC

[56] References Cited
UNITED STATES PATENTS

| | | |
|---|---|---|
| 3,612,654 | 10/1971 | Klein et al. ................... 350/160 LC |
| 3,622,224 | 11/1971 | Wysocki et al. ................... 350/150 |
| 3,647,280 | 3/1972 | Klein et al. ................... 350/160 LC |
| 3,703,329 | 11/1972 | Castellano ................... 350/150 |
| 3,703,331 | 11/1972 | Goldmacher et al. ........ 350/160 LC |
| 3,712,047 | 1/1973 | Girard ................... 58/50 R |
| 3,753,609 | 8/1973 | Leibowitz ................... 350/160 LC |
| 3,820,875 | 6/1974 | Bohmer ................... 350/160 LC |

*Primary Examiner*—Edward S. Bauer
*Assistant Examiner*—Matthew W. Koren
*Attorney, Agent, or Firm*—Baldwin, Wight & Brown

[57] ABSTRACT

A liquid crystal display arrangement comprising two electrodes separated by liquid crystal material, at least one of which has a pattern formed over a display area to provide a desired display and wherein there is provided on the side of the pattern electrode remote from the liquid crystal material a further electrode which extends continuously over the display area and which is electrically isolated from the pattern electrode.

13 Claims, 2 Drawing Figures

U.S. Patent   Oct. 21, 1975   3,914,019

LIQUID CRYSTAL DISPLAY ARRANGEMENTS

This invention relates to liquid crystal display arrangements.

The effect of passing a current through a thin film of nematic liquid crystal material between two electrodes is now well known. In the region of the current the liquid crystal material changes its light transmissive properties. If one of the two electrodes is patterned, therefore, and a current is passed between the two electrodes, a pattern of liquid crystals material of changed light transmissive light properties is formed which is visible if light is directed on to the surface of the arrangement or if light is passed through the arrangement. One or both of the electrodes are light transmissive depending upon whether the liquid crystal cell is of the transmissive or reflective type.

Both of the electrodes may be patterned. In a matrix type display a plurality of strip conductors on one side of the liquid crystals material is arranged in crossing relationship with a plurality of conductors provided on the other side of said liquid crystal material, so that by addressing one of the first plurality of conductors and one of the second plurality of conductors a spot may be displayed at the cross over point.

It is possible to obtain a storage effect by using suitable liquid crystal material so that when a d.c. or low frequency a.c. signal is passed through a region of the liquid crystals material, that region becomes less light transmissive and remains so for a period of time after removal of the signal. Erasure may be achieved by the application to that region of a higher frequency signal of suitable voltage.

One liquid crystal material which may be used to achieve a storage effect consists of nematic liquid crystal material mixed with cholesteric liquid crystal material. In this case, to create the display a signal of 40 volts at 50 Hertz is applied, whilst for erasure a signal of 60 volts at 5,000 Hertz is applied. Particularly with many mixtures which would otherwise be suitable to achieve a storage effect the initial appearance of the liquid crystal film is cloudy and, whilst the film may be cleared by applying an erasure signal between the two electrodes of the cell, where one of the electrodes is patterned clearance in the display area which is not covered by solid portions of the patterned electrode will not be achieved.

The present invention seeks to provide an improved liquid crystal display arrangement of improved erasure, and in particular improved storage, type in which the problem associated with the initial clearance of the material, where this is initially cloudy, is reduced.

According to this invention a liquid crystal display arrangement comprises two electrodes separated by liquid crystal material, at least one of which has a pattern formed over a display area to provide a desired display and wherein on the side of said pattern electrode, remote from said liquid crystals material is provided a further electrode which extends continuously over said display area at least in regions not covered by solid portions of said pattern electrode, said further electrode being electrically isolated from said pattern electrode.

Where both of said electrodes are patterned, as in the case of a matrix type display, where one electrode consists of a plurality of individually selectable conductors in crossing relationship with a plurality of individually selectable conductors forming said second electrode, a further electrode is provided on the side of each pattern electrode remote from said liquid crystal material, the one further electrode extending continuously over the display area at least in regions not covered by solid portions of the first electrode and the second further electrode extending continuously over the display area at least in regions not covered by solid portions of said second electrode.

Normally in each case said further electrode extends continuously over the whole of said display area including over those portions thereof which are covered by solid portions of said pattern electrode.

Preferably said liquid crystal material is one in which the change in light transmissive characteristic achieved by passing a current therethrough remains after said current is removed. One example of such a liquid crystal material is a mixture of nematic liquid crystal material and cholesteric liquid crystal material.

In all cases, erasure or clearance, whether it be a display created by passing current between said two electrodes or of any initial overall cloudiness in the liquid crystal material, may be achieved since a suitable erasure current can now be passed through the liquid crystal material over the whole display area.

Figure 2:
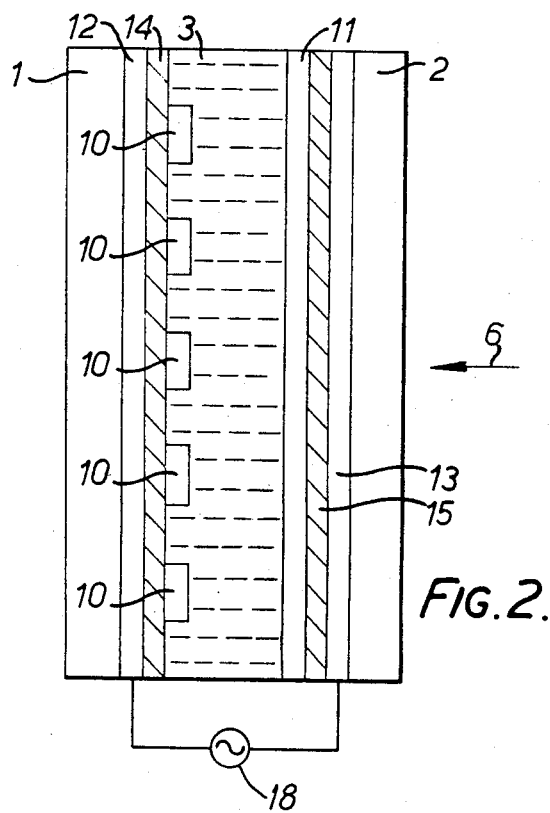

The invention is illustrated in and further described with reference to the accompanying drawing in which, FIG. 1 illustrates one liquid crystal display arrangement of the storage type in accordance with the present invention and FIG. 2 illustrates a further liquid crystal display arrangement of the storage type in accordance with the present invention.

In both Figures, like references denote like parts.

Referring to FIG. 1, the liquid crystal display arrangement consists of two glass plates 1 and 2, containing therebetween a film 3, less than 0.5 mm thick, of liquid crystal material. The liquid crystal material consists of a mixture of nematic liquid crystal material and cholesteric liquid crystal material. On the surface of glass plate 2 facing the liquid crystal film 3 is provided a first electrode 4, which extends continuously, without any pattern, over the entire display area. On the side of the liquid crystals material 3, opposite electrode 4, is a second electrode 5, which is patterned to present five strip-like bars. As so far described the cell is well known per se and if a signal of 40 volts at 50 Hertz is applied by means of source 16 between electrodes 4 and 5, the liquid crystal material 3 becomes less light transmissive in the regions of the five bars of electrode 5. Assuming the liquid crystal arrangement to be the transmissive type, a display in the shape of the five bars will be observed if viewed in the direction of the arrow 6, with illumination provided from the other side of the arrangement.

In accordance with the present invention on the side of the patterned electrode 5 remote from the liquid crystals material 3, and in fact on the surface of glass plate 1, is provided a further electrode 7, which, like electrode 4, extends continuously over the display area. Patterned electrode 5 is electrically isolated from the further electrode 7 by an interposed layer 8 of insulating material. Electrodes 4, 5 and 7 are of tin oxide.

With this arrangement erasure of the displayed pattern of five bars may be effected by applying an erasure signal of 60 volts at 5,000 Hertz by means of source 17, either between pattern electrode 5 and electrode 4, or between further electrode 7 and electrode 4, whilst initial clearance of the liquid crystals material 3, if this exhibits cloudiness overall, may be achieved by the application of an erasure signal of 60 volts at 5,000 Hertz between electrodes 4 and 7.

It is, of course, only necessary to provide further electrode 7 to extend over the display area in regions such as 9, not covered by solid portions of the electrode 5 to enable erasure current to be passed through the liquid crystal material over the whole display area. It is, however, simpler and more convenient to provide electrode 7 to extend continuously over the entire display area.

Electrodes 4, 5 and 7 and insulating layer 8 may be transparent in nature to form a liquid crystal display cell of the transmissive type.

Referring to FIG. 2, in this case the liquid crystal display arrangement is of the matrix type. A first set of parallel, individually addressable conductors 10 forms a first electrode, whilst a set of parallel, individually addressable conductors in crossing relationship with the conductors forming electrode 10, forms a second electrode 11. Electrodes 10 and 11 are as usual on either side of the film 3 of liquid crystal material. On the side of electrode 10 remote from film 3 is provided a further electrode 12, whilst on the side of electrode 11 remote from the film 3 is provided a further electrode 13. Further electrode 12 is electrically isolated from electrode 10 by a layer of insulating material 14, whilst further electrode 13 is electrically isolated from electrode 11 by a layer of insulating material 15. Electrodes 12 and 13 extend continuously over the whole display area as with electrode 7 of the arrangement of FIG. 1 and initial clearance of the liquid crystals material 3, and, of course, erasure of a displayed spot formed by addressing one of the conductors forming electrode 10 and one of the conductors forming electrode 11, may be achieved by applying an erasure signal of 60 volts at 5,000 Hertz by means of source 18 between electrodes 12 and 13.

I claim:

1. A liquid crystal display cell comprising not more than one layer of liquid crystal material and which material is of the storage type; two electrodes arranged one on each side of the liquid crystal material, at least one of which two electrodes is a pattern electrode which contacts and incompletely covers one side of the liquid crystal material so as to provide a desired display and to leave the remainder of said one side uncovered by said pattern electrode and the other of which two electrodes is in contact with said layer; a further electrode and an insulating layer disposed between and in contact with said pattern and said further electrode, which further electrode at least covers said remainder of said one side of the liquid crystal material; and conductor means connected to each of said two and said further electrode and extending therefrom for external connection whereby signals may be applied respectively for clearing an initial cloudiness in the liquid crystal material, for generating localized cloudiness according to the pattern of said pattern electrode and for erasing localized cloudiness according to the pattern generated.

2. A liquid crystal display cell as claimed in claim 1 wherein each of said two electrodes is a pattern electrode and wherein a respective further electrode overlies each of said pattern electrodes, one further electrode extending continuously over the display area at least in regions not covered by solid portions of the first of said pattern electrodes and the second further electrode extending continuously over the display area at least in regions not covered by solid portions of the second of said pattern electrodes.

3. A liquid crystal display cell as claimed in claim 2 wherein one of said pattern electrodes consists of a plurality of individually selectable conductors in crossing relationship with a plurality of individually selectable conductors forming the second pattern electrode.

4. A liquid crystal display cell as claimed in claim 1 and wherein said further electrode completely covers said one side of said liquid crystal material.

5. A liquid crystal display cell as claimed in claim 1 and wherein said liquid crystal material is a mixture of nematic liquid crystal material and cholesteric liquid crystal material.

6. In a liquid crystal display arrangement in combination:
   a layer of liquid crystal material which may be altered between different light transmissive states;
   first electrode means disposed on one side of and completely covering said layer and second electrode means disposed on the other side of and completely covering said layer, said first electrode means including a pattern electrode which incompletely covers said layer, a further electrode spaced from said pattern electrode, and insulating means separating said pattern electrode and said further electrode;
   first signal generating means connected between said first electrode means and said second electrode means, for applying a voltage across the entirety of said liquid crystal material initially to condition it to a non-displaying light transmissive state; and
   second signal generating means connected to said pattern electrode and to said second electrode means for locally applying a voltage across said liquid crystal material to condition it locally to a displaying liquid transmissive state.

7. In an arrangement as recited in claim 6 wherein said further electrode within said first electrode means covers the entirety of said liquid crystal material and said first signal generating means is connected between said first and second electrode means so as to create a potential between said further electrode and said second electrode means.

8. In an arrangement as recited in claim 6 wherein said second electrode means includes a second pattern electrode which incompletely covers said layer of liquid crystal material and a second further electrode spaced from said second pattern electrode, and insulating means separating said second pattern electrode and said second further electrode.

9. In an arrangement as recited in claim 8 wherein said second further electrode within said second electrode means covers the entirety of said liquid crystal material and said first signal generating means is connected between said first and second electrode means so as to create a potential between said second further electrode and said first electrode means.

10. In an arrangement as recited in claim 8 wherein said first pattern electrode and said second pattern electrodes are formed by a plurality of individually selectable conductors, the conductors of said first pattern electrode being in a crossing relationship with the conductors of said second pattern electrode.

11. In an arrangement as recited in claim 6 and wherein said liquid crystal material is one in which the change in light transmissive characteristics achieved by passing a current therethrough remains after said current is removed.

12. In an arrangement as recited in claim 11 and wherein said liquid crystal material is a mixture of nematic liquid crystal material and cholesteric liquid crystal material.

13. In an arrangement as recited in claim 6 wherein said pattern electrode, said further electrode and said insulating means are transparent in nature.

* * * * *